Dec. 27, 1966  C. R. HILPERT  3,293,944
POWER TRANSMISSION
Filed May 19, 1964  8 Sheets-Sheet 1

Inventor.
Conrad R. Hilpert
By John W. Daley
Attorney.

Dec. 27, 1966  C. R. HILPERT  3,293,944
POWER TRANSMISSION

Filed May 19, 1964  8 Sheets-Sheet 2

Inventor.
Conrad R Hilpert.
By John W Dailey
Attorney.

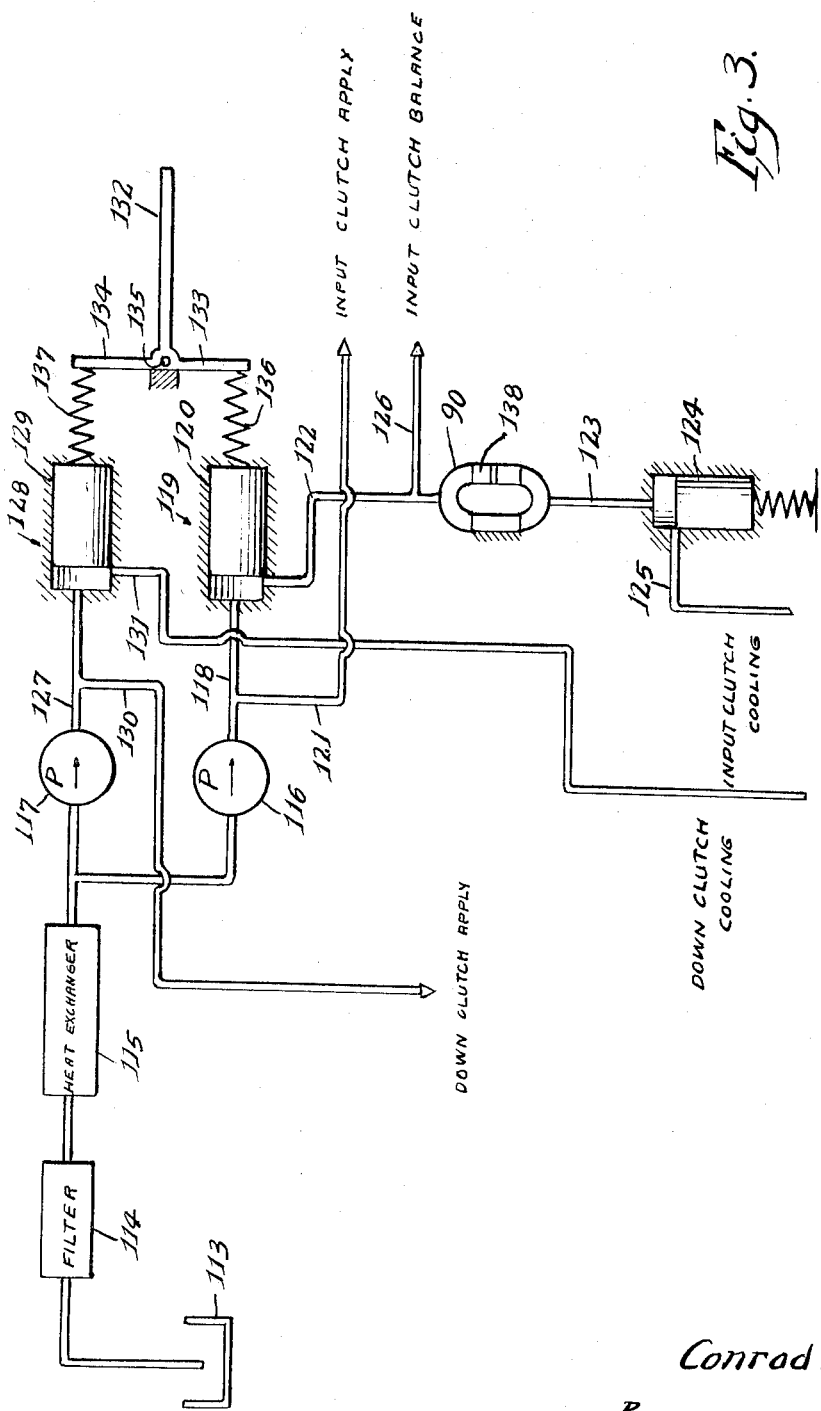

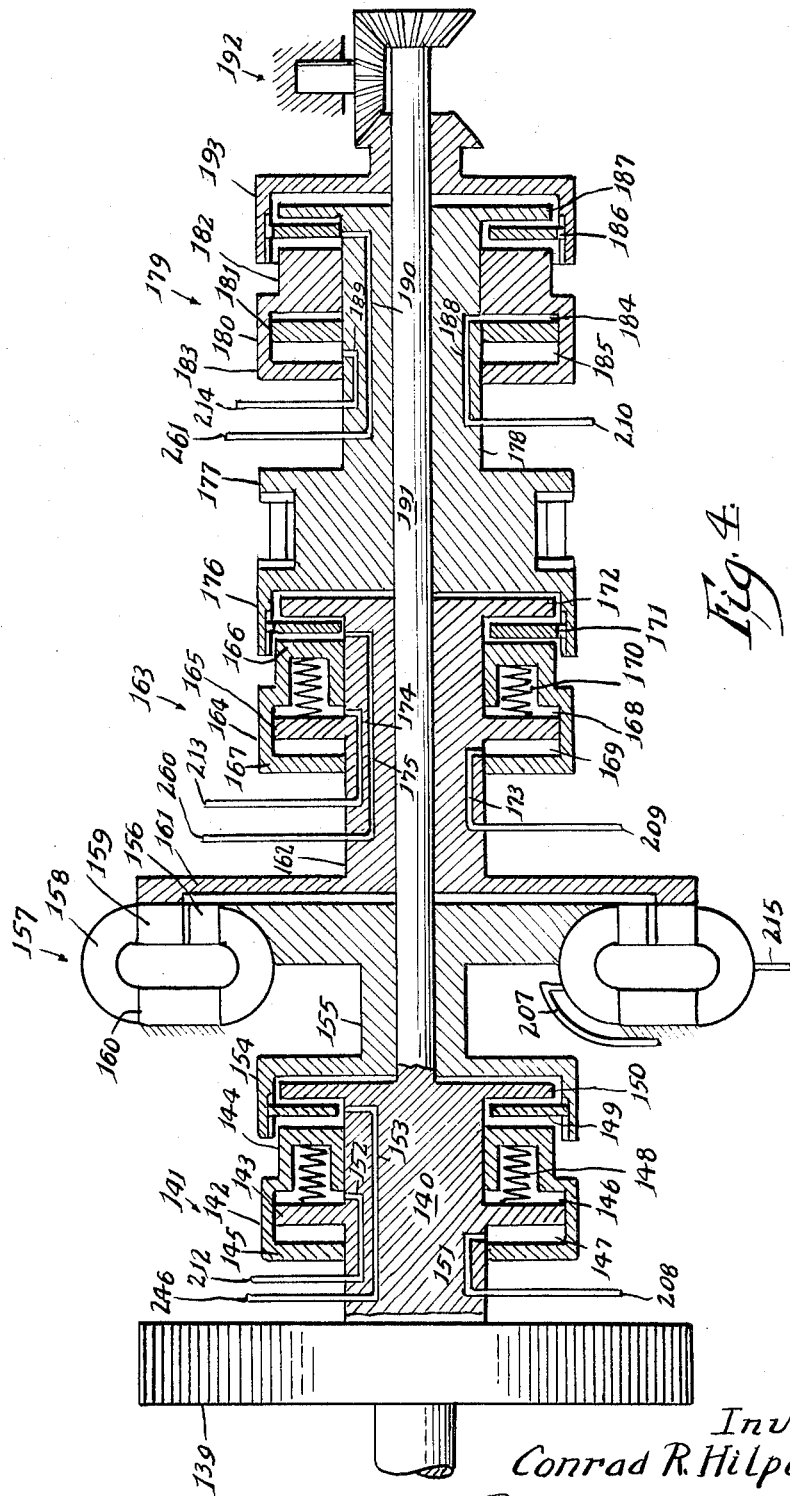

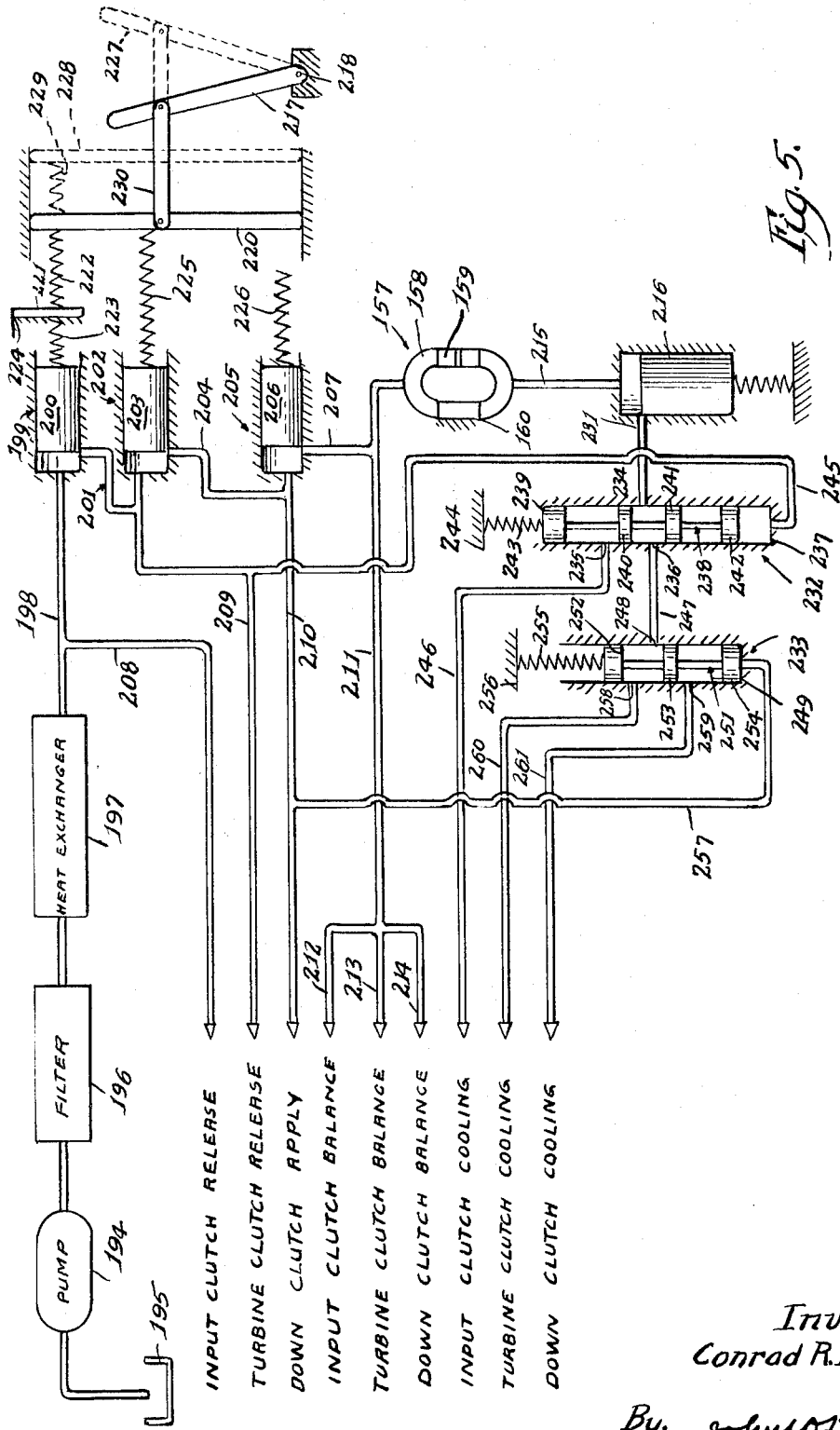

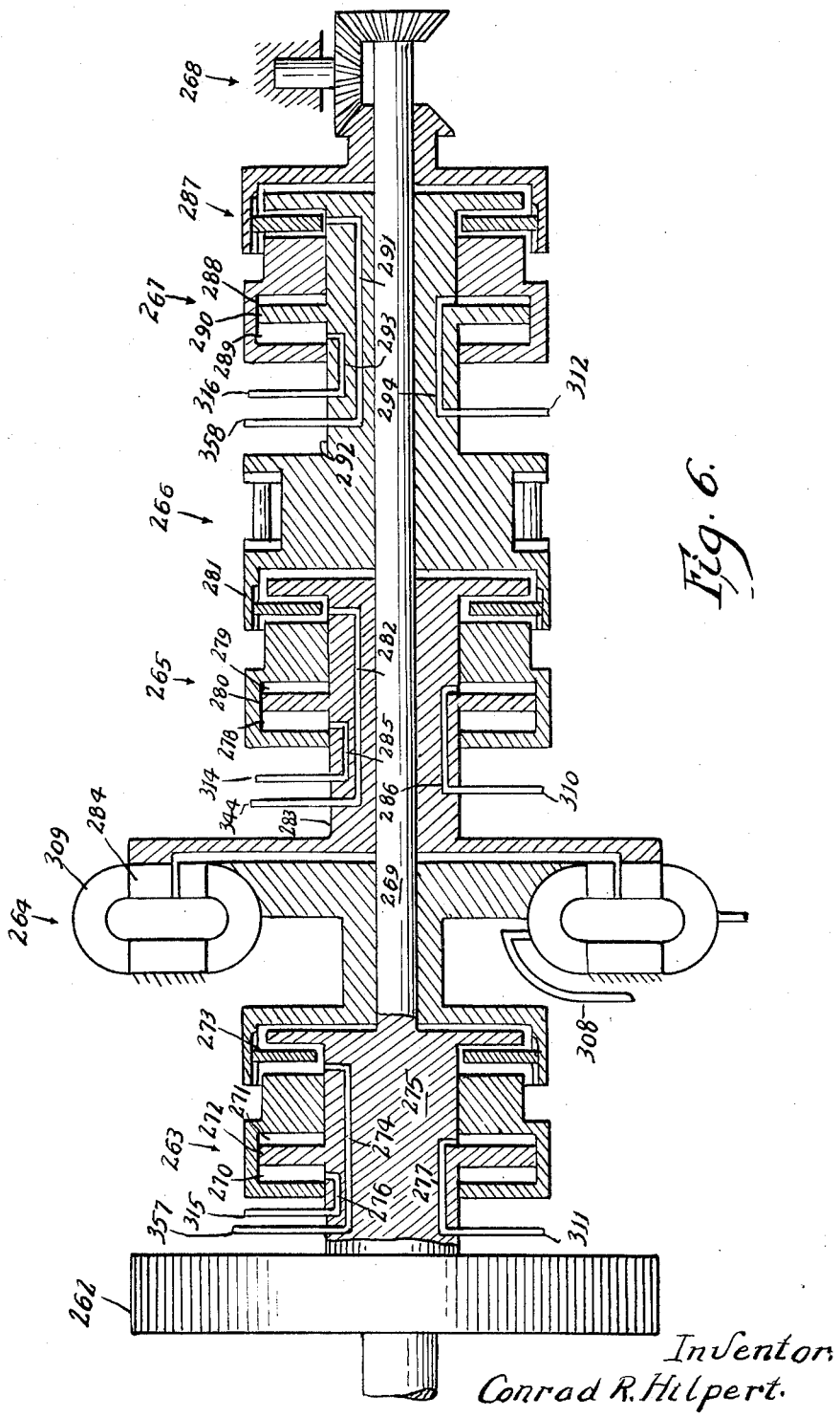

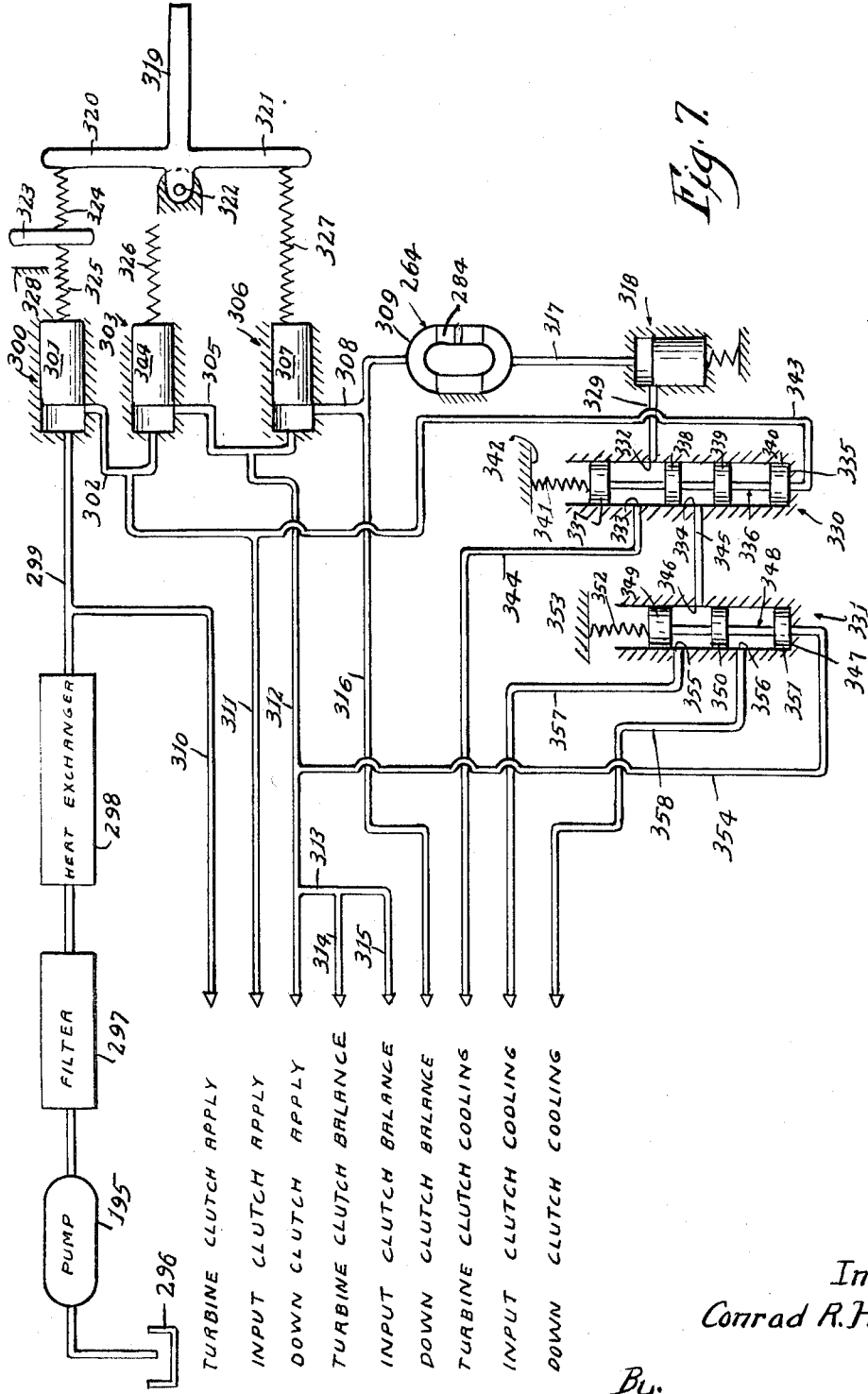

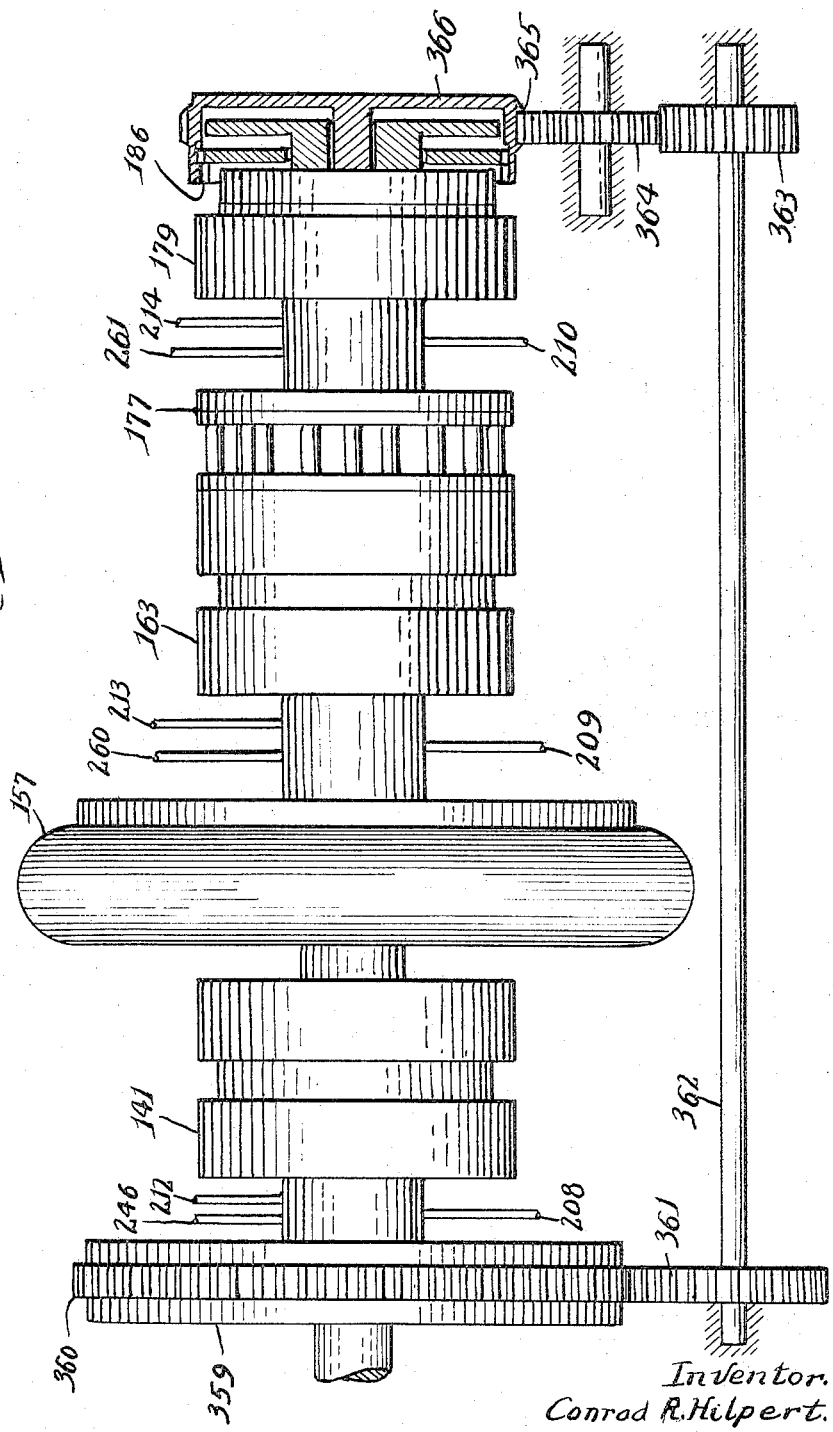

United States Patent Office 3,293,944
Patented Dec. 27, 1966

3,293,944
POWER TRANSMISSION
Conrad R. Hilpert, Winnebago, Ill., assignor to Twin Disc Clutch Company, Racine, Wis., a corporation of Wisconsin
Filed May 19, 1964, Ser. No. 368,670
18 Claims. (Cl. 74—732)

My invention relates to power transmissions and more particularly to a type that is especially arranged for hoists, cranes and shovels in that provision is made for application of power to the hoisting or digging implements of the associated apparatus during raising and lowering.

For convenience in describing the invention, raising and lowering of the load will be referred to as "power up" and "power down" applications, respectively.

One object of the invention is to provide a transmission of the character indicated in which power up and power down applications are at all times under infinitely smooth, positive control and including a like control during transition from up to down and vice versa.

A further object is the provision of such a transmission in which control is exercised by a single lever and which is further characterized by a fail safe construction that, in the event of failure of the hydraulic control circuitry, will enable the engine throttle, hoisting clutches and brake to prevent free dropping of the load.

A further object is to provide a transmission as set forth in which the infinitely smooth power up and power down controls of the load are independent of engine speed.

In the drawings:

FIG. 3 is a schematic of the circuitry for the FIG. 2 transmission conditioned to establish the release clutch positions shown in the latter figure.

FIG. 4 is a further variation of the FIGS. 1 and 2 transmissions in sectional elevation and in which an infinitely controllable clutch is tied in with the converter turbine to regulate its movement under selected conditions.

FIG. 5 is a schematic of the circuitry for the FIG. 4 transmission in which the several parts are conditioned to establish the clutch positions shown in FIG. 4.

FIG. 6 is a modification of the FIG. 4 transmission in which all clutches are shown released and in sectional elevation.

FIG. 7 is a schematic of the circuitry for the FIG. 6 clutches and the converter therefor.

FIG. 8 is an elevation, partly in section, showing a variant form of reversing the drive.

Figure 1:
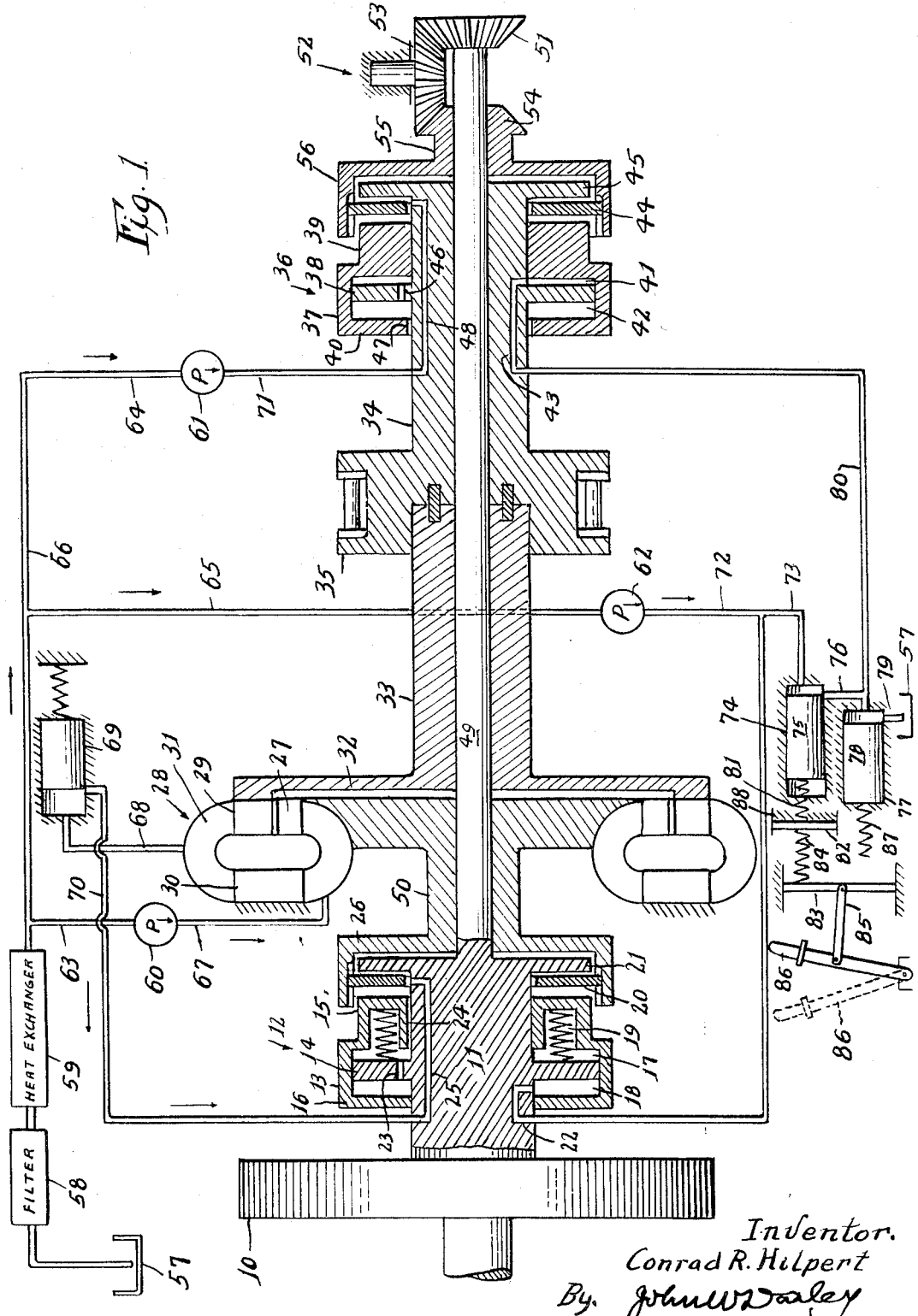
FIG. 1 is a sectional and schematic elevation of one form of the improved transmission which includes a hydraulic torque converter and in which full power is transmitted during power up and limited power during power down, the input and down clutches being shown in release positions and the drawing otherwise including a schematic of the oil circuitry.

Referring to FIG. 1, the numeral 10 designates a flywheel as representative of a power input to the transmission and which may be conveniently connected to a power source such as an engine or a turbine. The flywheel 10 drivingly connects with a hub 11 forming part of an input clutch 12 which includes an annular casing 13 that surrounds the hub 11 and an annular reaction member 14 extending laterally from and rotating with the hub 11. The casing 13 is shiftable axially relative to the hub 11 and reaction member 14 and is provided with annular end walls 15 and 16 which respectively define with the hub 11 and reaction member 14 annular chambers 17 and 18.

Positioned within the chamber 17 is a plurality of springs 19 interposed between the reaction member 14 and end wall 15 and which bias the casing 14 towards the right to frictionally engage the end wall 15 with the driven clutch plate 20 against an abutment ring 21 fixedly connected to the hub 11. The number of plates in the clutch 12 is immaterial as long as the primary requirements are satisfied and this factor holds true for all clutches hereinafter described.

Release of the clutch 12 is determined under selected and controlled conditions by a supply of pressure oil through a passage 22 in the hub 11 to the chamber 18, now termed the release chamber. The release chamber 18 constantly communicates through an orifice passage 23 with the spring chamber 17 to establish therein in the conventional manner a mass of oil that balances the centrifugal head produced by oil in the release chamber 18. Static pressure in the spring chamber 17 may be relieved through clearance 24 provided in the casing 13. Cooling oil is supplied to the friction surfaces of the input clutch 12 through a passage 25 in the hub 11 and the passages 22 and 25 are tied in with an oil circuit in the manner presently described. When engaged, the clutch 12 transmits power through a spider 26 connected to the clutch plate 20 and to an impeller 27 forming part of a hydraulic torque converter 28 which otherwise includes a turbine 29 and a fixed stator 30. The impeller 27, turbine 29 and stator 30 are conventionally related in a toroidal circuit 31 and, for purpose of disclosure only, the converter 28 is shown as being of the single stage type, but this aspect is not important.

The turbine 29 connects through a disk 32 with one end of a hollow shaft 33 whose opposite end has suitable connection with one end of a coaxial, hollow shaft 34 which is attached to a sprocket 35 that will be generally regarded as the output of the transmission.

Adjacent the opposite end of the hollow shaft 34 and carried thereby is an annular clutch 36 which includes an annular casing 37 that surrounds the hollow shaft 34 and an annular reaction member 38 which extends laterally from and rotates with the hollow shaft 34. The casing 34 is shiftable axially relative to the hollow shaft 34 and reaction member 38 and carries annular end walls 39 and 40 which respectively define with the hollow shaft 34 and reaction member 38 annular chambers 41 and 42.

The clutch 36 is engaged by supplying oil pressure under selective control through a passage 43 in the hollow shaft 34 to the chamber 41, now termed the apply chamber, and thereupon, the casing 37 is shifted to the right to frictionally engage the end wall 39 with a clutch plate 44 against an abutment ring 45 carried by the hollow shaft 34. The chamber 42 constitutes a balance chamber to which oil is fed from the apply chamber 41 through an orifice passage 46 in the reaction member 38 as a conventional means of balancing the centrifugal head developed in the apply chamber 41 and the static pressure in the balance chamber 42 is vented by a suitable clearance 47 in the end wall 40. Cooling oil is supplied to the friction elements of the clutch 36, now termed the down clutch, through a passage 48 in the hollow shaft 34 and the latter passage along with the passage 43 are connected to cooling and control circuits in the manner presently described.

A shaft 49 is drivenly connected at one end to the hub 11 and extends coaxially through a hollow shaft 50 which connects the spider 26 with the impeller 27, and further coaxially through the hollow shafts 33 and 34 for connection with a bevel gear 51 forming part of a reverse gear 52. The bevel gear 51 constantly meshes with an idler bevel gear 53 which also constantly meshes with a bevel gear 54 carried by a hub 55 attached to a spider 56 that has driving connection with the clutch plate 44. For convenience, the reverse gear 52 is shown as having a 1:1 ratio, but this factor may be changed to meet operating conditions.

From the above, it will be understood that when the input clutch 12 is engaged and the down clutch 36 disengaged, power flow is through the converter 28 to the sprocket 35 to determine upward movements of the load. With the input clutch 12 released and the down clutch 36 engaged, and since the shaft 49 constantly rotates with the engine, the power flow from the shaft 49 is successively through the reverse gear 52, the spider 56, the down clutch 36 and the hollow shaft 34 to the sprocket 35 to thereby determine power down movements of the load. During this operation, the turbine 29 rotates reversely in the toroidal circuit 31.

The oil circuits for supplying cooling oil to the input and down clutches 12 and 36, respectively, and for supplying release and apply pressure oil to the same clutches, respectively, with modulating control on the pressure oils will now be described.

The oil is withdrawn from a convenient sump 57 for flow serially through a filter 58 and heat exchanger 59 by means of pumps 60, 61 and 62 which are disposed in parallel relation so that their inlets are connected by pipes 63, 64 and 65, respectively, to the outlet pipe 66 of the heat exchanger 59. The outlet of the pump 60 connects through an inlet pipe 67 with the toroidal circuit 31 to constantly maintain filling thereof and this circuit connects through an outlet pipe 68 with the inlet of a conventional pressure regulating valve 69 whose outlet connects through a pipe 70 with the passage 25 to supply cooling oil to the friction elements of the input clutch 12 and from which this oil discharges to the sump 57. The pressure maintained in the converter 28 by the valve 69 may be of the order of 60 p.s.i. while that of the cooling oil for the input clutch 12 when engaged may be of the order of 15 p.s.i. and somewhat less when the latter clutch is released. These oil pressures are by way of example. The outlet of the pump 61 connects through a pipe 71 with the passage 48 to supply cooling oil to the friction elements of the down clutch 36 and the pressure values for this oil may correspond to those for the input clutch 12.

The outlet of the pump 62 connects through a pipe 72 with the passage 22 for applying pressure oil to the release chamber 18 of the input clutch 12, and through a pipe 73 with the inlet of a pressure regulating valve 74 which includes a piston 75. The outlet of the valve 74 connects through a pipe 76 with the inlet of a pressure regulating valve 77 which includes a piston 78 and whose outlet connects through a pipe 79 with the sump 57. The pipe 76 also connects with a pipe 80 leading to the passage 43 for supplying pressure oil to the apply chamber of the down clutch 36. It will be understood that, in the above circuit, where the pipes connect with passages in rotating elements of the transmission, the oil passes through conventional rotary seals (not shown). The same condition applies to all other transmissions.

Release pressure oil is supplied to the chamber 18 of the input clutch 12 by a modulated control of the pressure regulating valve 74 and apply pressure oil is supplied to the chamber 41 of the down clutch 36 by a like control of the pressure regulating valve 77, each in the manner which will now be described.

A spring 81 is interposed between the left end of the valve piston 75 and a push plate 82 and interposed between the opposite side of the push plate 82 and a slide 83 is a spring 84. The slide 83 is conventionally mounted for linear to and fro movements and connects through a link 85 with an operator controlled lever 86. A spring 87 is interposed between the left end of the valve piston 78 and the slide 83, but in the position of parts shown in FIG. 1, terminates short of the slide 83 so that the valve piston 78 is not loaded by the spring 87 and the regulating valve 77 is fully open to the sump 57.

The regulating valves 74 and 77 are shown in positions determining release of the input and down clutches 12 and 36, respectively, by the indicated location of the lever 86. To reach this location, the lever 86 has been rocked from a position to the left of that shown in FIG. 1 and wherein the then leftward positions of the slide 83 and push plate 82 are such as to completely unload the springs 81 and 84 so that the piston valve 75 also shifts to the left to fully connect the valve 74 with the sump 57. Release pressure is then non-existent in the chamber 18 of the input clutch 12 and engagement thereof is effected by the springs 19.

As the lever 86 is rocked from the leftward position shown dotted in FIG. 1, the spring 84 is compressed and so effects a movement of the push plate 82 to compress the spring 81, thus causing a movement of the piston valve 75 to the right and hence a rising pressure in the release chamber 18 of the input clutch 12. When the push plate 82 abuts a stop 88, compression of the spring 81 has reached a point where pressure in the release chamber 18 is sufficient to just effect a full release of the input clutch 12.

As mentioned above, engagement of the input clutch 12 determines upward movement of the load and it will be apparent that in moving the lever 86 from the full to the dotted line position, the pressure in the release chamber 18 of the input clutch 12 and hence the output of the input clutch 12 is at all times under complete and infinitely variable control and substantially up to full engagement of the input clutch 12. The speed of the upward movement of the load can therefore be infinitely and smoothly controlled and including inching movements of the load and a stoppage by suitable slipping of the input clutch 12.

For power down operation of the load and assuming, as a starting point and by way of example, that the several components of the transmission are conditioned as shown in FIG. 1, the lever 86 is further rocked clockwise to begin loading the spring 87 with a consequent supply and rise of the apply pressure in the chamber 41 of the down clutch 36. This regulation does not affect the then input clutch release regulation of the valve 74 since the holding of the push plate 82 by the stop 88 prevents further loading of the spring 81.

Continued loading of the spring 87 eventually establishes a pressure in the chamber 41 sufficient to fully engage the down clutch 36 so that the sprocket 35 rotates in reverse direction to lower the load. It will be apparent that control on the application of apply pressure to the down clutch 36 is smooth and infinitely variable to thereby determine like variations in the lowering speed of the load, including stoppage and inching movements by appropriate slippage of the down clutch 36.

During lowering of the load, the reverse rotation of the sprocket 35 causes a like rotation of the turbine 29 which provides an inherent hydrodynamic braking during the lowering operation. The transition from power up to power down operation and vice versa may be effected rapidly and the transmission further has a fail safe characteristic because in the event of failure of oil pressure, the input clutch 12 is immediately engaged by the springs 19 and control of the load reverts to control on the engine.

Figure 2:
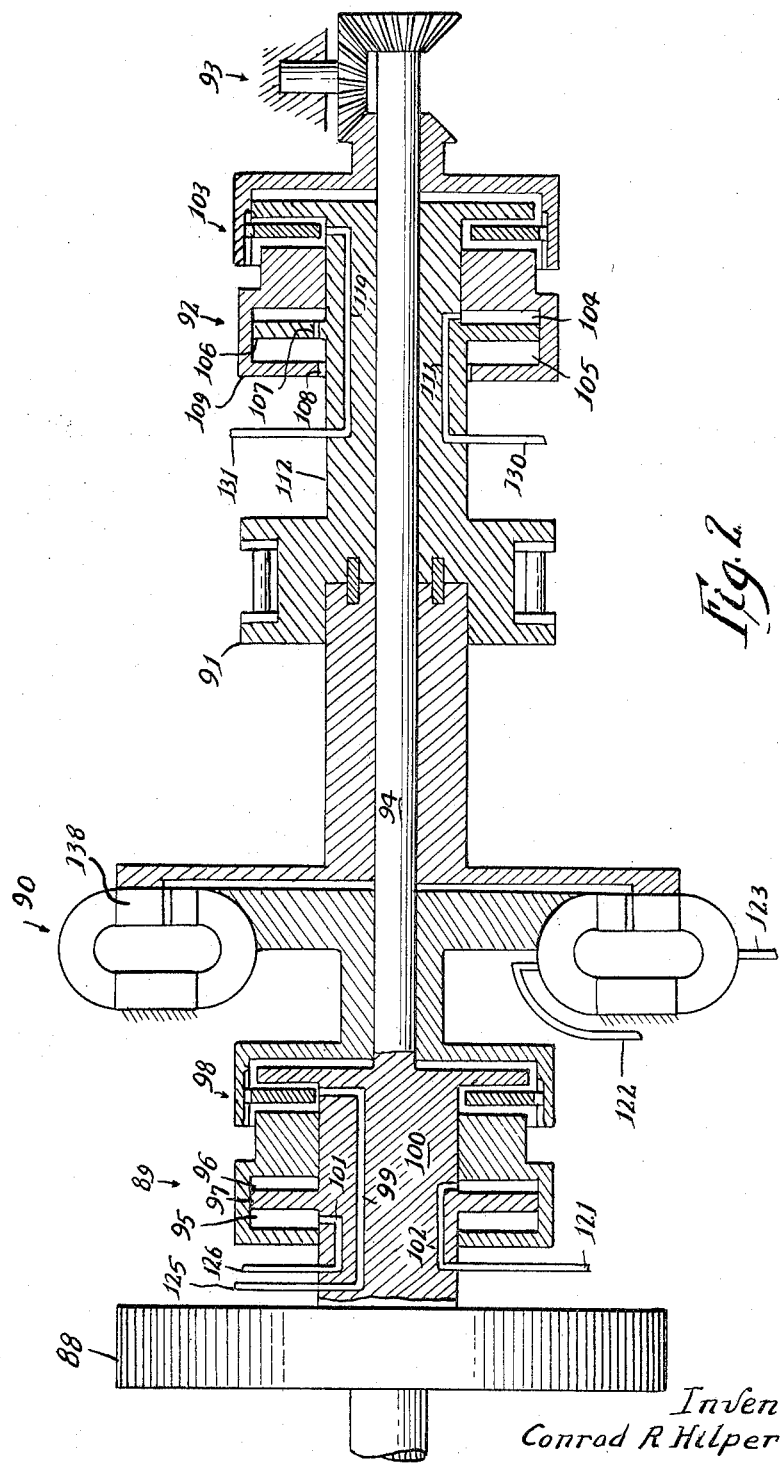
FIG. 2 is a modified form of the FIG. 1 transmission in sectional elevation, less the circuitry therefor and with the input and down clutches in release positions.

In FIGS. 2 and 3 is shown a modification of the FIG. 1 transmission which differs therefrom in that the input and down clutches are each oil pressure actuated and that a somewhat different control circuit is employed.

Referring to FIG. 2, the flywheel 88, input clutch 89, hydraulic torque converter 90, sprocket 91, down clutch 92 and reverse gear 93 are related in the same manner as the same titled components, respectively, in FIG. 1, except for the oil pressure engagement of the input clutch 89. Accordingly, when engaged, the input clutch 89 drives through the converter 90 and the sprocket 91 to raise the load, and with the input clutch 89 released and the down clutch 92 engaged, the drive from the flywheel 88 is successively through the connected shaft 94, reverse gear 93, down clutch 92 and sprocket 91 to power down the load.

The input clutch 89 is of the same general type as the input clutch 12 except that the former includes a balance chamber 95 and an oil apply chamber 96 which are separated by a reaction member 97. The friction elements of the input clutch 89, generally designated by the numeral 98, are supplied with cooling oil through a passage 99 in the input clutch hub 100, and oil for the balance chamber 95 is supplied and for the apply chamber 96 is selectively supplied through passages 101 and 102, respectively, in the hub 100. The passages 99, 101 and 102 are connected to a control circuit in the manner presently described.

The down clutch 92 is identical with the down clutch 36 and hence includes friction elements, generally designated by the numeral 103, an apply chamber 104 and a balance chamber 105 separated by a reaction member 106. As before, the apply chamber 104 communicates through an orifice 107 in the reaction member 106 and the balance chamber 105 is vented by a suitable clearance 108 in the down clutch casing 109. The friction elements 103 are supplied with cooling oil through a passage 110 and the apply chamber 104 is selectively supplied with pressure oil through a passage 111, the passages 110 and 111 being embodied in a hollow shaft 112, corresponding to the hollow shaft 34 in FIG. 1, and connected to a control circuit in the manner presently described.

The cooling and control circuit for the FIG. 2 transmission is shown in FIG. 3 to which reference will now be made.

The oil is withdrawn from a sump 113 for flow serially through a conventional filter 114 and heat exchanger 115 by means of pumps 116 and 117 which are arranged in parallel and have their inlets commonly connected to the output of the heat exchange 115. The sump 113 serves as a collector for all cooling oil discharged from the input and down clutches 89 and 92, respectively, and the balance chambers 95 and 105.

A pipe 118 connects the outlet of the pump 116 with the inlet of a pressure regulating valve 119 having a piston 120 and the pipe 118 also connects through a pipe 121 with the passage 102 (see FIG. 2) leading to the apply chamber 96 of the input clutch 89. The outlet of the valve 119 connects through an inlet pipe 122 with the converter 90 to maintain filling thereof and the outlet from the converter 90 is provided by a pipe 123 which connects with the inlet of a conventional pressure regulating valve 124 whose outlet connects through a pipe 125 with the passage 99 (see FIG. 2) to provide cooling oil flow to the friction elements 98 of the input clutch 89. The pipe 122 is tapped by a pipe 126 that connects with the passage 101 (see FIG. 2) leading to the balance chamber 95 of the input clutch 89.

The outlet of the pump 117 connects by a pipe 127 with the inlet of a pressure regulating valve 128 having a piston 129 and also with a pipe 130 connected to the passage 111 (see FIG. 2) leading to the apply chamber 104 of the down clutch 92. The outlet of the valve 128 connects through a pipe 131 with the passage 110 (see FIG. 2) to provide a cooling oil flow to the friction elements 103 of the down clutch 92.

From the foregoing, it will be apparent that the pressure regulating valves 119 and 128 determine the apply pressures to the input and down clutches 89 and 92, respectively, and the manner of achieving these results including a modulating control on such pressures will now be described.

A control lever 132 having lateral and oppositely extending arms 133 and 134 is pivoted at 135 and positioned between the free ends of the arms 133 and 134 and the valve pistons 120 and 129 are springs 136 and 137, all respectively. In the position of the lever 132 shown in FIG. 3, the springs 136 and 137 are unloaded so that the input clutch 89 and down clutch 92 stand released as shown in FIG. 2. For upward movement of the load, the lever 132 is rocked clockwise to load the spring 136 and thereby establish in the chamber 96 of the input clutch 89 a modulating control on the apply pressure therefor and hence an infinitely variable control on the upward speed of the load. For down movements of the load with infinitely variable speed control thereof, the lever 132 is rocked counterclockwise beyond the position shown in FIG. 3 and this action is accompanied by the braking rotation of the converter turbine 138 as noted for FIG. 1. The regulating valves 120 and 129 will be selected to provide the desired pressures for the input clutch 89 and down clutch 92, and the valve 124 will be selected to establish the desired constant pressure in the converter 90.

The transmissions shown in FIGS. 1 to 3, inclusive, are alike in that power down movements of the load are subject to the inherent braking provided by the converter turbine. This may be a desirable feature where the load is usually heavy, but is a detriment where the load is light and the requirement is a swift lowering of the load. In FIGS. 4 to 7, inclusive, are disclosed variations including a modulated clutch control on the turbine enabling it to function for its primary purpose when the drive is through the converter, or to be completely released for free rotation during down movements of the load and including a positive control during reverse movements of the turbine to provide full or partial hydrodynamic braking.

Referring to FIG. 4, the numeral 139 designates a conventional engine flywheel constituting the input of the transmission and which has driving connection with a hub 140 on which is supported an annular, friction, input clutch 141. This clutch includes an annular casing 142 which is axially shiftable on the hub 140 and additionally slides on the periphery of an annular reaction member 143 that extends laterally from the hub 140 and is fixed thereto. The casing 142 includes annular end walls 144 and 145 which respectively define with the hub 140 and reaction member 143 annular chambers 146 and 147.

Positioned within the chamber 146 is a plurality of springs 148 which are interposed between the reaction member 143 and end wall 144 and which bias the casing 142 towards the right to frictionally grip a driving plate 149 against an abutment ring 150 fixedly connected to the hub 140. Release of the input clutch 141 is effected by supplying oil pressure to the release chamber 147 through a passage 151 in the hub 140. Oil is also supplied to the chamber 146 to balance the centrifugal oil head in the release chamber 147 through a passage 152 in the hub 140 and cooling oil is supplied to the friction elements of the input clutch 141 through a passage 153 also in the hub 140. The passages 151, 152 and 153 are tied in with an oil circuit presently described.

The output of the input clutch 141 is provided by an annular spider 154 having driven engagement with the driving plate 149 and which connects through a hollow shaft 155 with an impeller 156 forming part of a conventional hydraulic torque converter 157. The converter otherwise includes a toroidal circuit 158, a turbine 159 and a fixed stator 160. The turbine 159 connects through a disk 161 with a hollow shaft 162 which is coaxial with the hollow shaft 155 and input clutch 141.

Mounted on the hollow shaft 162 is an annular, turbine control clutch 163 which includes an annular casing 164 that is axially shiftable on the hollow shaft 162 and also slides on the periphery of an annular reaction member 165 that extends laterally from the hollow shaft 162 and is fixed thereto. The casing 164 includes annular end walls 166 and 167 which respectively define with the hollow shaft 162 and reaction member 165 annular chambers 168 and 169.

Located within the chamber 168 is a plurality of springs 170 which are positioned between the reaction member 165 and end wall 166 and which bias the casing 164 towards the right to frictionally grip a driving plate 171 against an abutment ring 172 fixed to the hollow shaft 162 and so engage the turbine control clutch 163. Release of the clutch 163 is accomplished by supplying oil pressure to the release chamber 169 through a passage 173 in the hollow shaft 162. Oil is also supplied to the chamber 168 to balance the centrifugal oil head in the release chamber 169 and to the friction elements of the turbine control clutch 163 respectively through passages 174 and 175 in the hollow shaft 162. The passages 173, 174 and 175 are connected to an oil circuit presently described. The output of the turbine control clutch 163 is provided by a toothed annulus 176 having driven engagement with the driving plate 171 and which is connected to a coaxial sprocket 177 constituting the output of the transmission.

The sprocket 177 connects with a coaxial hollow shaft 178 on which is mounted an annular down clutch 179 which includes an annular casing 180 that is axially shiftable on the hollow shaft 178 and also slides on the periphery of an annular reaction member 181 that extends laterally from the hollow shaft 178 and is fixed thereto. The casing 180 includes annular end walls 182 and 183 which respectively define with the hollow shaft 178 and reaction member 181 annular apply and balance chambers 184 and 185. When oil pressure is supplied to the apply chamber 184, the end wall 182 frictionally grips a driven plate 186 against an abutment ring 187 fixed to the hollow shaft 178 and so engages the down clutch 179. Oil pressure to the apply chamber 184, balance chamber 185 and the friction elements of the down clutch 179 are respectively supplied through passages 188, 189 and 190 in the hollow shaft 178 and these passages are connected to an oil circuit presently described.

Power flow to the down clutch 179 is effected through a shaft 191 which is connected at one end to the hub 140 and extends coaxially through the hollow shafts 155, 162 and 178 for connection with the input of a reverse gear which may be identical with those described above and is generally designated by the numeral 192. The output of the latter gear has driving engagement with the clutch plate 186 through a spider 193.

The clutches 141, 163 and 179 are selectively operable with any desired modulating control and balancing and cooling oil flow is supplied thereto by means of the systemic arrangement which will now be described.

Referring to FIG. 5, a pump 194 withdraws oil from a convenient sump 195 for discharge successively through a filter 196 and a heat exchanger 197 and supply through a pipe 198 to the inlet of a pressure regulating valve 199 having a piston 200. The outlet of the valve 199 connects by a pipe 201 with the inlet of a pressure regulating valve 202 having a piston 203 and the outlet of the valve 202 connects by a pipe 204 with the inlet of a pressure regulating valve 205 having a piston 206. A pipe 207 connects the outlet of the valve 205 with the toroidal circuit 158 to maintain filling of the converter 157 at a constant pressure as presently described.

Pipes 208, 209 and 210 connect the pipes 198, 201 and 204 with the passage 151 to establish a release pressure for the input clutch 141, with the passage 173 to establish a release pressure for the turbine control clutch 163, and with the passage 188 to establish an apply pressure for the down clutch 179, all respectively (see FIG. 4). As presently described, the regulating valves 199 and 202 are operable, respectively, to provide a modulating control on the release pressures for the input clutch 141 and turbine control clutch 163, and the regulating valve 205 is likewise operable to provide a similar control on the apply pressure for the down clutch 179.

One end of a pipe 211 connects with the pipe 207 leading to the converter 157 and the opposite end of the pipe 211 connects with branch pipes 212, 213 and 214 which in turn connect with passages 152, 174 and 189 leading to the balance chambers of the input, turbine and down clutches 141, 163 and 179, all respectively (see FIG. 4). The outlet of the toroidal circuit 158 connects by a pipe 215 with the inlet of a conventional pressure regulating valve 216 which establishes the working pressure in the converter 157 and also through the pipe 211 the balance pressures for the input, turbine and down clutches 141, 163 and 179, respectively.

Modulating control of the regulating valves 199, 202 and 205 is effected by the following instrumentalities. An operator controlled lever 217 is pivoted at 218 and is connected by a link 219 to a slide 220 which is suitably mounted for to and fro, linear movements. Interposed between the slide 220 and a push plate 221 is a spring 222 and between the push plate 221 and valve piston 200 is a spring 223. Loading of the springs 222 and 223 by a leftward movement of the slide 220 provides an infinitely variable control on the input clutch release pressure acting through the pipe 208 up to the maximum value determined by engagement of the push plate 221 with a stop 224 which is the position shown in FIG. 5. This position determines the full release of the input clutch 141 as shown in FIG. 4.

Modulating control for the regulating valves 202 and 205 is provided by interposing springs 225 and 226 between the pistons 203 and 206, all respectively, and the slide 220. In the FIG. 5 position, the slide 220 has loaded the spring 225 to some extent so that the regulating valve 202 has determined through the pipe 209 a partial release of the turbine clutch 163. Due to drawing limitation, this partial release is schematically indicated by a reduction in the axial spacings between the end wall 166, clutch plate 171 and abutment ring 172 compared to the similar spacings in the fully released input and down clutches 141 and 179, respectively. As shown in FIG. 4 and for the full line position of the slide 220 shown in FIG. 5, the friction elements of the turbine clutch 163 may be in slipping contact. Further, the slide 220 has not been moved sufficiently to engage the spring 226 so that the regulating valve 205 is fully open and the down clutch 179 is not subjected to apply pressure and stands released. However, balance pressures exist in the chambers 146, 168 and 185 of the input, turbine and down clutches 141, 163 and 179, respectively, since these chambers connect with the output of the regulating valve 205.

The conditioning of the oil circuit as shown in FIG. 5 may be accomplished, for example, from an initial position of the lever 217 indicated by the numeral 227 and an associated position of the slide 220 as indicated by the numeral 228, each of the last named positions being shown dotted in FIG. 5. In these dotted positions of the lever 217 and slide 220, the springs 222, 223, 225 and 226 are completely unloaded by the slide 220 and the push plate 221 occupies a position spaced to the right from the stop 224. Also, the right ends of the springs 222 and 225 then extend to the right as shown dotted in FIG. 5 and as indicated by the numerals 229 and 230, respectively, and with the right end of the spring 222 lightly contacting the slide 220 and with the right end of the spring 225 spaced at a smaller distance from the slide position 228 than is the same end of the spring 226.

When the lever 217 occupies position 227, the regulating valves 199, 202 and 205 are fully open so the input clutch 141 and turbine clutch 163 are engaged by their respective springs 148 and 170, and the down clutch 179 is fully released. The transmission is accordingly conditioned for power up movements of the load.

To shift from power up to power down movement, the lever 217 is moved from dotted position 227 towards and beyond the full line position thereof. This movement first begins to load the springs 222 and 223 with an accompanying movement of the push plate 221 towards the left and so initiates a pressure rise of the oil in the release chamber 147 of the input clutch 141. Continued movement of the lever 217 in the indicated direction causes a loading of the spring 225 sufficient to establish a full release pressure in the chamber 169 of the turbine clutch 163 and a loading of the spring 226 sufficient to establish an apply pressure in the chamber 184 of the down clutch 179.

During the shift from power up to power down, the assembly of the springs 222 and 223, and the springs 225 and 226 are loaded sequentially and the rate of loading may be as fast or as slow as the operator selects with consequent modulation on the power transmitting characteristics of the several clutches. With the load moving rapidly to a stop or to a position where an upward movement of the load is required, the down clutch 179 is released and the turbine clutch 163 is gradually applied to thereby establish a hydrodynamic brake on the falling load. Gradual engagement of the input clutch 141 will then bring the load to a stop or raise it. The shift from power down to power up or stop is effected by the proper clockwise movement of the lever 217.

Cooling oil for the several clutches is supplied through a pipe 231 providing a connection between the outlet of the pressure regulating valve 216 and control valves 232 and 233 which depending upon oil pressure conditions in the circuit allocate the cooling oil to individual clutches at times when most needed. For purpose of description only, the control valves 232 and 233 are schematically shown as being of the spool type, but no restriction is intended thereby.

The control valve 232 includes an inlet port 234 which constantly connects with the delivery end of the pipe 231 and outlet ports 235 and 236 provided in a casing 237. Slidable in the casing 237 of the control valve 232 is a conventional spool valve stem 238 having spaced lands 239, 240, 241 and 242 suitably connected for simultaneous movement. The valve stem 238 is biased towards the lower end of the casing 237 by a spring 243 interposed between the land 239 and an abutment 244. The lower end of the casing 237 beneath the land 242 connects by a pipe 245 with the pipe 209 and hence is in communication with the pipe 201. Therefore, whenever a pressure rise occurs in the pipe 201 due to actuation of the regulating valve 202, this rise is effective through the pipe 245 and against the land 242 to move the valve stem 238 to its upper position as shown in FIG. 5. The port 235 connects through a pipe 246 with the passage 153 (see FIG. 4) leading to the friction elements of the input clutch 141.

A pipe 247 connects the outlet port 236 in the control valve 232 with an inlet port 248 in the casing 249 of the control valve 233. Slidable in the casing 249 is a conventional spool type valve stem 251 having spaced lands 252, 253 and 254 suitably connected for simultaneous movement. A spring 255 interposed between the land 252 and an abutment 256 biases the valve stem 251 to the down position shown in FIG. 5. A pipe 257 connects the lower end of the casing 249 beneath the land 254 with the pipe 210 and hence is in communication with the pipe 204. Accordingly, a pressure rise determined by an actuation of the regulating valve 205 will be effective through the pipe 257 and against the land 254 to move the valve stem 251 to its upper position as presently described.

The casing 249 of the control valve 233 also includes outlet ports 258 and 259 which, in the down position of the control valve 233 shown, respectively communicate with the casing 249 between the lands 252 and 253, and the lands 253 and 254. A pipe 260 connects the port 258 with the passage 175 (see FIG. 4) leading to the friction elements of the turbine clutch 163, and a pipe 261 connects the port 259 with the passage 190 leading to the friction elements of the down clutch 179.

In describing the operation of the cooling oil control, it is expedient to consider the input clutch 141 and turbine clutch 163 fully engaged and the down clutch 177 released so that the transmission is conditioned for power up operation. The lever 217 and slide 220 then occupy their dotted positions 227 and 228, respectively, and the springs 222, 223, 225 and 226 are unloaded. Effective pressure is therefore absent in the pipe 245 and the valve stem 238 occupies its down position due to the action of the spring 243. In this position, it will be apparent from FIG. 5 that the location of the land 240 is then such as to deny communication between the ports 234 and 236 while establishing communication between the ports 234 and 235 and hence a supply of cooling oil to the input clutch 141. At the same time, and since there is no effective pressure in the pipe 257, the control valve 233 occupies the down position shown and cooling oil does not flow therethrough.

As noted above, in shifting from a power up to a power down movement of the load, the lever 217 is rocked counterclockwise from dotted position 227 to effect loading of the springs 222 and 223, a pressure rise in the pipes 198 and 208 and eventually a complete release of the input clutch 141. Continued movement of the lever 217 beyond the full line position thereof loads the springs 225 to determine the application of release pressure to the turbine clutch 163 through the pipe 209. The latter pressure rise operating through the pipe 245 also conditions the control valve 232 as shown in FIG. 5 and wherein the land 240 denies communication between the ports 234 and 235 and hence a supply of cooling oil to the released input clutch 141. The relation of the lands 240 and 241 is such as to place the ports 234 and 236 in communication and cooling oil flows successively from the regulating valve 216 through the pipe 231, port 234, casing 237 between the lands 240 and 241, port 236, pipe 247, port 248, the casing 249 between the lands 252 and 253, and port 258 to the pipe 260 and the friction elements of the turbine clutch 163 which are then in relatively sliding contact, particularly during a modulated control thereof.

Continued rocking of the lever in the counterclockwise direction begins to load the spring 226 with a consequent pressure rise in the pipe 210 leading to the apply chamber 184 of the down clutch 179. This pressure rise is effective through the pipe 257 against the land 254 of control valve 233 with an ensuing movement of the valve stem 251 to its up position. In the latter, the land 253 then denies communication between the ports 248 and 258 to stop oil flow to the friction elements of the turbine clutch 163, and to place the ports 248 and 259 in communication between the lands 253 and 254. Cooling oil may then flow from the control valve 232, then in the up position shown, through the pipe 247, ports 248 and 259, and thence through the pipe 261 and connected passage 190. In shifting from power down to power up movements of the load and as far as the cooling oil flow is concerned, the action of the control valves 232 and 233 is reversed from that explained above.

In FIGS. 6 and 7 is shown a further modificaton of the FIGS. 4 and 5 transmission wherein the primary differences are that the input and turbine clutches are oil pressure actuated for engagement and that the control circuit may be conditioned by a lever which has a definite rest or neutral position determining a release of all clutches.

Referring to FIG. 6, the flywheel 262, input clutch 263, converter 264, turbine clutch 265, sprocket 266, down clutch 267 and reverse gear 268 are associated in the same manner as the same titled components, respectively, in FIG. 4, except for the oil pressure engagement of the input clutch 263 and turbine clutch 265. Accordingly, when the input clutch 263 and turbine clutch 265 are engaged, the power up drive is through these clutches, the converter 264 and the sprocket 266. For power down operation, the input clutch 263 and turbine clutch 265 are released and the down clutch 267 is engaged and the drive from the flywheel 262 is then successively through the connected shaft 269, reverse gear 268, down clutch 267 and sprocket 266. Modulated control of any of the clutches is possible as presently described for the same reasons as noted for FIG. 4 and including such control of the turbine clutch 265 during power down drive.

The input clutch 263 is of the same general type as the input clutch 141 in FIG. 4 except that the former includes a balance chamber 270 and an oil apply chamber 271 which are separated by an annular reaction member 272. The friction elements of the input clutch 263, generally designated by the numeral 273, are supplied with cooling oil through a passage 274 in the input clutch hub 275, and oil for the balance chamber 270 is constantly supplied and for the apply chamber 271 is selectively supplied through passages 276 and 277, respectively, in the hub 275. The passages 274, 276 and 277 are connected to a control circuit presently described.

The turbine clutch 265 is of the same general type as the turbine clutch 163 in FIG. 4 except that the former includes a balance chamber 278 and an oil apply chamber 279 which are separated by a reaction member 280. The friction elements of the turbine clutch 265, generally designated by the numeral 281, are supplied with cooling oil through a passage 282 in a hollow shaft 283 on which the turbine clutch 265 is mounted and which connects with the turbine 284 of the converter 264. Oil for the balance chamber 278 is constantly supplied and for the apply chamber 279 is selectively supplied through passages 285 and 286, respectively, in the hollow shaft 283. The passages 282, 285 and 286 are connected to a control circuit presently described.

The down clutch 267 is identical with the down clutch 179 in FIG. 4 and hence includes friction elements, generally designated by the numeral 287, an apply chamber 288 and a balance chamber 289 separated by a reaction member 290. The friction elements 287 are supplied with cooling oil through a passage 291 in a hollow shaft 292 on which the down clutch 267 is mounted and which connects with the sprocket 266. Oil for the balance chamber 289 is constantly supplied and for the apply chamber 288 is selectively supplied through passages 293 and 294, respectively, in the hollow shaft 292, the passages 291, 293 and 294 being embodied in the hollow shaft 292 and connected to a control circuit presently described.

The control circuit for the FIG. 6 transmission is shown in FIG. 7 to which reference will now be made.

A pump 295 withdraws oil from a convenient sump 296, which collects all oil discharged from the transmission, and forces the same successively through a filter 297 and a heat exchanger 298 and supply through a pipe 299 to the inlet of a pressure regulating valve 300 having a piston 301. The outlet of the valve 300 connects by a pipe 302 with the inlet of a pressure regulating valve 303 having a piston 304 and the outlet of the valve 303 connects by a pipe 305 with the inlet of a pressure regulating valve 306 having a piston 307. A pipe 308 connects the outlet of the valve 306 with the toroidal circuit 309 of the converter 264 to maintain filling thereof at a constant pressure as presently described.

Pipes 310, 311 and 312 connect the pipes 299, 302 and 305 with the passages 286, 277 and 294 leading to the apply chambers 279, 271 and 288 of the turbine, input and down clutches 265, 263 and 267, all respectively (see FIG. 6). As in the other modifications, the regulating valves 300, 303 and 306 may be conditioned to provide a modulating control on the pressures in the associated apply chambers with consequent infinitely variable control on the torque transmitting capacities of the related clutches.

A pipe 313 connects with the pipe 312 and is branched to provide pipes 314 and 315 connecting with passages 285 and 276 leading to the balance chambers 278 and 270 of the turbine and input clutches 265 and 263, all respectively, while a pipe 316 provides connection between the pipe 308 leading to the converter 264 and the passage 293 leading to the balance chamber 289 of the down clutch 267. The outlet of the toroidal circuit 309 connects by a pipe 317 with the inlet of a conventional pressure regulating valve 318 which establishes the working pressure in the converter 264 and also through the pipe 316 the balance pressure for the down clutch 267.

Modulating control of the regulating valves 300, 303 and 306 is effected in the following manner. An operator controlled lever 319 having oppositely disposed, lateral arms 320 and 321 is pivoted at 322. Interposed between the free end of the arm 320 and one side of a push plate 323 is a spring 324 and between the other side of the push plate 323 and the valve piston 301 is a spring 325. A spring 326 is interposed between the arm 320 and the valve piston 304 and, in the position of parts shown in FIG. 7, the right end of the spring 326 is spaced from the arm 320, and a spring 327 is interposed between the free end of the arm 321 and the valve piston 307.

In the FIG. 7 conditioning of the circuit, the lever 319 occupies a true rest or neutral position, the springs 324, 325, 326 and 327 being unloaded so that the regulating valves 300, 303 and 306 are fully open and the related clutches are fully released as shown in FIG. 6.

For a power up movement of the load, the lever 319 is rocked counterclockwise to thereby begin loading the springs 324 and 325, thus moving the push plate 323 towards the left and through the regulating valve 300 effecting a pressure rise in the apply chamber 279 of the turbine clutch 265 and eventual full engagement thereof. When the latter occurs, the push plate 323 abuts a stop 328 so that this engaging pressure is determined by the then loading of the spring 325. However, the yield provided by the spring 324 enables further rocking of the lever 319 in counterclockwise direction to load the spring 326 and effect through the regulating valve 303 a pressure rise in the apply chamber 271 of the input clutch 263 up to full engagement thereof. The power up drive is then successively through the input clutch 263, converter 264, turbine clutch 265 and sprocket 266.

From the above, it will be apparent that the engagements of the turbine clutch 265 and input clutch 263 occur in sequence. It is possible to so arrange the lever-spring relations so that initiation of engagement of the input clutch 263 begins before the turbine clutch 265 is full engaged, this factor depending upon operating requirements.

For power down operation, the lever 319 is rocked clockwise and if this rocking begins with the lever 319 in a position determining power up movement, the input clutch 263 releases first, followed by the release of the turbine clutch 265. Eventual loading of the spring 327 effects through the regulating valve 306 a pressure rise in the apply chamber 288 of the down clutch 267. For obvious reasons and as explained above, the apply pressures to the several clutches are under modulating control with consequent speed regulation of the load movement including stoppage.

From FIG. 7, it will be apparent that, when the down clutch 267 is engaged, the balance pressures for the turbine clutch 265 and input clutch 263 are tapped from the apply pressure pipe 312 for the down clutch 267. With the input clutch 263 and turbine clutch 265 engaged, balance pressure for the down clutch 267 is determined by the regulating valve 318 acting through the pipe 316.

Cooling oil for the several clutches is supplied through a pipe 329 providing a connection between the outlet of the pressure regulating valve 318 and control valves 330 and 331 which, depending upon oil pressure conditions in the circuit allocate cooling oil to individual clutches as operating conditions require. The valves 330 and 331 are for convenience shown as being of the spool type without restriction.

The control valve 330 includes an inlet port 332 which constantly connects with the delivery end of the pipe 329 and outlet ports 333 and 334 provided in a casing 335. Slidable in the casing 335 is a conventional spool type valve stem 336 having spaced lands 337, 338, 339 and 340 suitably connected for simultaneous movement. The valve stem 336 is arranged to occupy two positions, the down position shown towards which it is biased by a spring 341 interposed between the land 337 and an abutment 342, and an up position when pressure exists in a pipe 343 whose opposite ends respectively connect with the casing 335 beneath the land 340 and the pipe 311 and hence with the pipe 302. Pressure rise in the pipe 343 occurs when the regulating valve 303 is actuated as outlined above. The outlet port 333 connects through a pipe 344 with the passage 282 (see FIG. 6) leading to the friction elements of the turbine clutch 265.

A pipe 345 connects the outlet port 334 in the control valve 330 with an inlet port 346 in the casing 347 of the control valve 331. Slidable in the casing 347 is a conventional spool type valve stem 348 having spaced lands 349, 350 and 351 suitably connected for simultaneous movement. A spring 352 interposed between the land 349 and an abutment 353 biases the valve stem 348 to the down position shown in FIG. 7. A pipe 354 connects the lower end of the casing 347 beneath the land 351 with the pipe 312 and hence is in communication with the pipe 305. Accordingly, a pressure rise determined by actuation of the regulating valve 306 will be effective through the pipe 354 and against the land 351 to move the valve stem 348 to its up position.

The casing 347 of the control valve 331 also includes outlet ports 355 and 356 which, in the down position of the control valve 331, respectively communicate with the casing 347 between the lands 349 and 350, and the lands 350 and 351. A pipe 357 connects the port 355 with the passage 274 (see FIG. 6) leading to the friction elements of the input clutch 263, and a pipe 358 connects the port 356 with the passage 291 leading to the friction elements of the down clutch 267.

In the conditioning of the oil circuit as shown in FIG. 7, all clutches released and the control valves 330 and 331 in the lower positions, cooling oil is supplied only to the friction elements of the turbine clutch 265 since the ports 332 and 333 are in communication. When a sufficient pressure rise is established in the pipe 343 by the regulating valve 303 during a power up conditioning of the transmission as described above, the control valve 330 shifts to its up position to deny communication between the ports 332 and 333 and to establish communication between the ports 332 and 334. The cooling oil flow is then successively through the pipe 345, ports 346 and 355, pipe 357 and passage 274 to the friction elements of the input clutch 263.

During power down operation, the pressure rise in the pipe 354 determined by actuation of the regulating valve 306 moves the control valve 331 to its up position in which communication between the ports 346 and 355 is denied and communication between the ports 346 and 356 is established. Coincident therewith, the control valve 330 is held in its up position by pressure established by the regulating valve 306 acting through the regulating valve, then in fully open position, and the pipes 302 and 343. The cooling oil flow is then through the pipe 345, ports 346 and 356, pipe 358 and passage 291 to the friction elements of the down clutch 267.

It will be apparent that the output of any of the above transmissions would be connected, for example, to the input of a drum or any equivalent unit in a hoisting and lowering apparatus.

In FIG. 8 is shown a variant arrangement for reversing the power flow to obtain a power down drive and for convenience only is related to the drive shown in FIG. 4. Since in FIG. 8 the input, turbine control and down clutches and the hydraulic torque converter are related to each other and the common output sprocket as are the same elements in FIG. 4, the former are designated by the same numerals as in FIG. 4.

The numeral 359 designates a flywheel which is connected to the input clutch 141 in the manner shown in FIG. 4 and which is peripherally toothed at 360 to mesh with a gear 361 carried by one end of a suitably journaled countershaft 362. The opposite end of the countershaft 362 carries a gear 363 which meshes with an appropriately journaled gear 364 that in turn meshes with the toothed periphery 365 of an annular spider 366, corresponding to the spider 193 in FIG. 4, that has driving engagement with the driven plate 186 in the down clutch 179. It will be obvious that the same countershaft reverse drive could be employed in FIGS. 1, 2 and 6.

I claim:

1. For use with apparatus having means for hoisting and lowering a load, a power transmission connectible to a power source and including hoisting and lowering power trains having a common output arranged for connection to the input of the apparatus, the hoisting power train including in series power flow relation a first hydraulically controlled friction clutch for providing connection with the power source, a hydraulic torque converter and the common output, and the lowering power train including in series power flow relation a reverse gear connected to the power source, a second hydraulically controlled friction clutch and the common output, means for selectively determining the engagement of either clutch including means for infinitely modulating either engagement to provide any desired rotative speed of the common output in either direction.

2. A power transmission as defined in claim 1 wherein the first clutch is spring biased in engaging direction and includes a release chamber for receiving a liquid whose pressure is regulated by said modulating means.

3. A power transmission as defined in claim 2 wherein the second clutch is hydraulically actuated to engage.

4. A power transmission as defined in claim 1 wherein shaft means connects the reverse gear to the power source and extends through and in coaxial relation to the first and second clutches, converter and common output.

5. A power transmission as defined in claim 1 wherein the first clutch is spring loaded in engaging direction and includes a release chamber and the second clutch is hydraulically actuated to engage and includes an apply chamber, both chambers being adapted to receive a supply of liquid under pressure, and the modulating means includes first and second pressure regulating valves pipe connected to the release and apply chambers, respectively, and each valve having a piston and a spring abutting each piston and arranged to be loaded by said selective means to respectively regulate the pressures in the release and apply chambers.

6. A power transmission as defined in claim 5 wherein a liquid circuit is provided for connection to a liquid source and to deliver flow to branch cooling and control circuits arranged in parallel, one cooling circuit leading to the friction elements of said first clutch and including in series flow relation a pump, said converter, and a relief valve to maintain a constant filling of the converter at a determined pressure, another cooling circuit leading to the friction elements of said second clutch and including a pump, and the control circuit including a pump and said first and second pressure regulating valves arranged in back pressuring relation, and the selective means being movable between a position determining a release of said first clutch and an engagement of said second clutch and an engagement of said first clutch and a release of said second clutch.

7. A power transmission as defined in claim 1 wherein each clutch is hydraulically actuated to engage by a liquid whose pressure is regulated by said modulating means.

8. A power transmission as defined in claim 7 wherein each clutch includes an apply chamber for receiving a supply of liquid under pressure, and the modulating means including first and second pressure regulating valves pipe connected to the apply chambers, respectively, and each valve having a piston and a spring abutting each piston and arranged to be loaded by said selective means to respectively regulate the pressures in the apply chambers.

9. A power transmission as defined in claim 8 wherein a liquid circuit is connected to a liquid source to provide flow to branch circuits arranged in parallel, one branch circuit including in series flow relation a pump, said first regulating valve, said converter, a relief valve to maintain a constant filling of the converter at a determined pressure and a pipe for supplying cooling liquid to the friction elements of said first clutch, the other branch circuit including in series flow relation a pump, said second regulating valve and a pipe for supplying cooling liquid to the friction elements of said second clutch, and separate pipes connecting the inlets of said first and second regulating valves with the apply chambers of said first and second clutches, and the selective means being movable between positions alternatively supplying engaging pressure to the apply chambers of said first and second clutches.

10. A power transmission as defined in claim 1 wherein the reverse gear is offset from the axis of the hoisting power train.

11. For use with apparatus having means for hoisting and lowering a load, a power transmission connectible to a power source and including hoisting and lowering power trains having a common output arranged for connection to the input of the apparatus, the hoisting power train including in series power flow relation a first hydraulically controlled friction clutch for providing connection with the power source, a hydraulic torque converter having a turbine, a turbine control friction clutch and the common output, and the lowering power train including in series power flow relation a reverse gear connected to the power source, a second hydraulically controlled friction clutch and the common output, means for determining the engagement of the turbine control and first clutches in sequence and selectively determining the engagement of the second clutch, and means for infinitely modulating the engagement of any clutch to provide any desired rotative speed of the common output in either direction.

12. A power transmission as defined in claim 11 wherein the first and turbine control clutches are each spring biased in engaging direction and each includes a release chamber for receiving a liquid whose pressure is regulated by said modulating means.

13. A power transmission as defined in claim 12 wherein the second clutch is hydraulically actuated to engage.

14. A power transmission as defined in claim 11 wherein the first and turbine control clutches are each spring biased in engaging direction and each includes a release chamber and the second clutch is hydraulically actuated to engage and includes an apply chamber, each chamber being adapted to receive a supply of liquid under pressure, and the modulating means including first, second and third pressure regulating valves pipe connected to the release chambers of the first and turbine control clutches and the apply chamber, respectively, and each valve having a piston and a spring abutting each piston and arranged to be loaded by said selective means to respectively regulate the pressures in the release and apply chambers.

15. A power transmission as defined in claim 14 wherein a liquid circuit includes a pump whose inlet and outlet respectively connects with a liquid source and the inlet of said first regulating valve, said second regulating valve being disposed in back pressure relation to said first regulating valve and said third regulating valve being disposed in back pressure relation to said second pressure regulating valve and having series flow connection with said converter and a relief valve to maintain a constant filling of the converter at a determined pressure, pipes respectively connecting the inlets of said first and second regulating valves with the release chambers of said first and turbine clutches and the inlet of said third regulating valve with the apply chamber of said second clutch, and circuit cooling supply means including control valves having series flow relation with the outlet of the relief valve and operable in response to pressures determined by said second and third regulating valves to provide cooling flow to said second and third clutches, respectivly, and the selective means being movable between a position determining the engagement of the first and turbine control clutches and the release of the second clutch and a position determining a pressure supply to the release chambers of the first and turbine control clutch in sequence and a pressure supply to the apply chamber of the second clutch.

16. A power transmission as defined in claim 11 wherein each clutch is hydraulically actuated to engage by a liquid whose pressure is regulated by said modulating means.

17. A power transmission as defined in claim 16 wherein each includes an apply chamber for receiving a supply of liquid under pressure, and the modulating means includes first, second and third pressure regulating valves pipe connected to the apply chambers of the first, turbine control and second clutches, respectively, and each valve having a piston and a spring abutting the piston and arranged to be loaded by said selective means to respectively regulate the pressures in the apply chambers.

18. A power transmission as defined in claim 17 wherein a liquid circuit includes a pump whose inlet and outlet respectively connects with a liquid source and the inlet of said second regulating valve, said first regulating valve being disposed in back pressure relation to said first regulating valve and said third regulating valve being disposed in back pressure relation to said first regulating valve and having series flow connection with said converter and a relief valve to maintain a constant filling of the converter at a determined pressure, pipes respectively connecting the inlets of said second, first and third regulating valves with the apply chambers of said turbine, first and second clutches, and circuit cooling supply means including control valves having series flow relation with the outlet of the relief valve and operable in response to pressures determined by said first and third regulating valves to provide cooling flow to said first and third clutches, respectively, and the selective means being movable between a position supplying pressure to the apply chambers of the turbine control and first clutch in sequence and alternatively to supply pressure to the apply chamber of the second clutch.

No references cited.

DAVID J. WILLIAMOWSKY, *Primary Examiner.*

L. H. GERIN, *Assistant Examiner.*